No. 897,301. PATENTED SEPT. 1, 1908.
G. McEACHRON.
ANIMAL TRAP.
APPLICATION FILED MAR. 12, 1908.
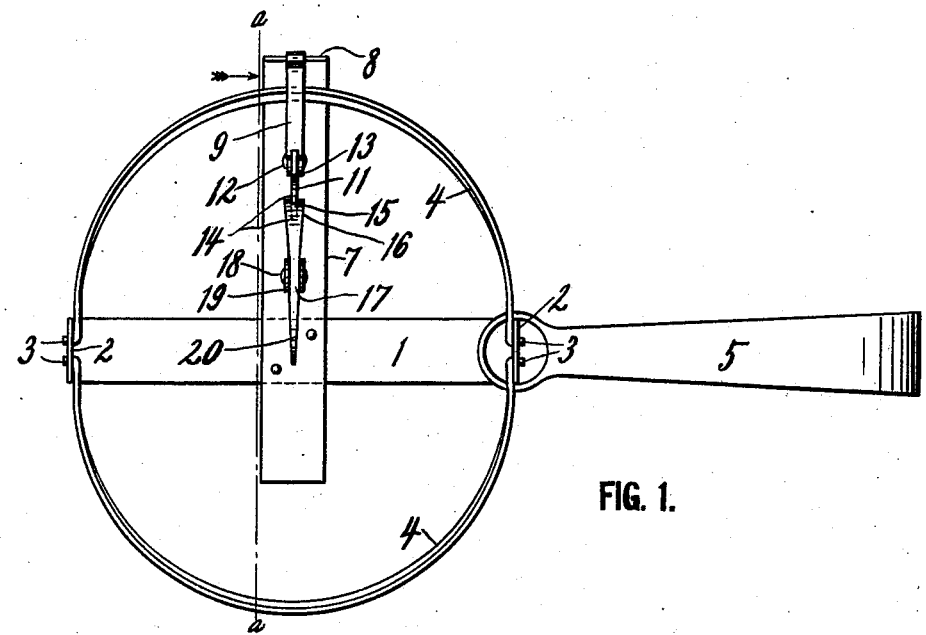
FIG. 1.
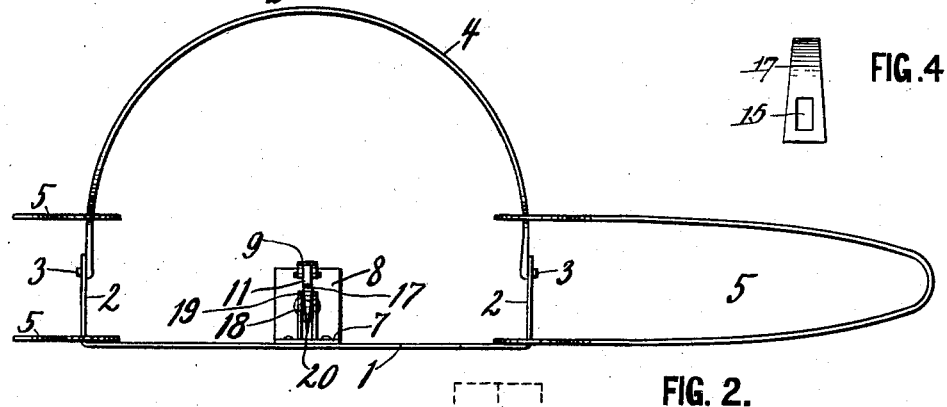
FIG. 4.
FIG. 2.
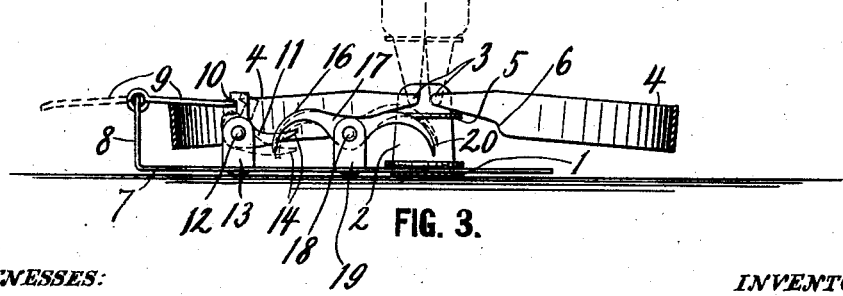
FIG. 3.
WITNESSES:
D. E. Carlsen.
M. M. Carlsen.
INVENTOR:
George McEachron.
BY HIS ATTORNEY:
A. M. Carlsen.
THE NORRIS PETERS CO., WASHINGTON, D. C.

UNITED STATES PATENT OFFICE.

GEORGE McEACHRON, OF FORSYTH, MICHIGAN.

ANIMAL-TRAP.

No. 897,301.

Specification of Letters Patent.

Patented Sept. 1, 1908.

Application filed March 12, 1908. Serial No. 420,532.

*To all whom it may concern:*

Be it known that I, GEORGE McEACHRON, a citizen of the United States, residing at Forsyth, in the county of Marquette and State of Michigan, have invented a new and useful Animal-Trap, of which the following is a specification.

My invention relates to animal traps; and the object is to provide an effective trap for catching various kinds of animals more readily and with less suffering to the animal and less damage to its fur than when caught by the ordinary traps heretofore constructed.

In the accompanying drawing,—Figure 1 is a top view of my improved trap in set position. Fig. 2 is a side elevation of the trap in sprung position and with portions of a second spring added. Fig. 3 is a sectional view on the line a—a in Fig. 1. Fig. 4 is a left hand end view of the trip lever 17 in Fig. 3.

Referring to the drawing by reference numerals, 1 designates the base or main frame bar whose upstanding ends form posts 2 in which are journaled the ends 3 of a pair of semicircular jaws 4, between which the animal is to be caught. Said jaws are closed by a V-shaped spring 5, of which there may be only one as in Fig. 1, or two of them as in Fig. 2, when the trap is for large animals. Said jaws are formed with shoulders 6 for the springs to stop against so as to regulate their upward movement.

At or near the middle of the bar is secured upon it a transversely disposed side arm 7, whose outer end portion 8 is curved upward and has pivoted to it one end of a lever 9, which when the trap is set extends inward over one of the jaws and has its inner end held down by the notch or mouth 10 of a bird-shaped trigger 11, which is pivoted at 12 in a post 13 of the arm 7 and has its tail 14 inserted in a hole 15 in the flat arched arm 16 of a two-armed trip-lever 17, which is pivoted at 18 in another post 19, which is also fixed in the arm 7. The other arm of the lever 17 is formed into an arched bait hook 20, whose point is curved downwardly so that a bait put on it cannot be removed by the animal without pulling upward at the hook and thus cause the arm 16 to swing the tail 14 downward and thereby disengage the trigger from the end of the lever 9, which is then instantly thrown outward as in dotted lines in Fig. 3, by the jaw at that side of the trap and the trap is thus swung and the animal caught.

As a long experienced trapper I will say that in earlier constructed traps nearest resembling my trap the jaws are usually made almost straight and comparatively low in the middle, which is evidently with an intention to catch the animal only by the legs, the result of which is untold suffering to the animal before it dies, besides that it frightens other animals by the squealing and in many instances the animal gnaws off the leg and escapes; while in other cases the nose or front part of the head is caught and caused to bleed so badly that the trap is unfit for use for some time until thoroughly cleansed and aired, most animals being afraid of blood or even the smell of it. To avoid all this I make the jaws at least semicircular, but even like arches higher in the middle than the radii of their curve so that the animal of the size for which the trap is made is caught about the neck and thus killed quickly and without bleeding. And by the bait hook and tripping mechanism described the bait is held so low down that the animal must put its head fully inside the jaws of the trap to get hold of the bait and a very light pull at it will spring the trap.

Having thus described my invention, what I claim is:—

1. In an animal trap, the combination with a base bar having upstanding posts, a pair of arched jaws having their ends journaled in said posts and one or more springs arranged to close the jaws of a lateral arm extending from the middle of the base bar and having at its outer end a post near the outer side of the adjacent jaw when the latter is open and posts 13 and 19 farther in on the arm, a lever 9 pivoted to the outer post and transversing the top of the open jaw, an angular lever pivoted in the post nearest the inner side of the jaw and having a vertical arm with a notch engaging the inner end of the lever 9 and a horizontal arm, a two-armed lever pivoted in the innermost post of the lateral arm and having one of its arms pivotally engaged with the horizontal arm, of the angular lever and its other arm formed into a bait hook disposed in the middle of the trap.

2. In an animal trap of the kind described having two arched jaws, the combination with one of its jaws of a frame arm extending outward below and beyond the open jaw, of a lever pivoted to said arm outside the jaw and adapted to hold the jaw down by reaching inward over its upper edge, two levers pivotally mounted on the frame arm inside the open jaw and engaging one another, one of said two levers engaging the lever that holds down the jaw, and the other having an arm formed into a bait hook near the middle of the trap, substantially as shown and described.

In testimony whereof I affix my signature, in presence of two witnesses.

GEORGE McEACHRON.

Witnesses:
FRANK W. ULRICH,
CHAN. C. BROWN.